United States Patent [19]

Akiyama

[11] Patent Number: 4,809,094
[45] Date of Patent: Feb. 28, 1989

[54] METHOD OF ACCESSING DATA RECORDED ON A DISK AT A HIGH SPEED

[75] Inventor: Ryo Akiyama, Hirakata, Japan

[73] Assignee: Matsushita Electric Industrial Co., Ltd, Kadoma, Japan

[21] Appl. No.: 58,884

[22] Filed: Jun. 5, 1987

[30] Foreign Application Priority Data

Jun. 11, 1986 [JP] Japan ................................ 61-135720
Jun. 13, 1986 [JP] Japan ................................ 61-138571

[51] Int. Cl.$^4$ ........................................... G11B 27/00
[52] U.S. Cl. ................................... 360/72.1; 358/907; 360/78.07; 369/32
[58] Field of Search ................. 358/907; 360/72.1, 73, 360/78; 369/32

[56] References Cited

U.S. PATENT DOCUMENTS

| | | | |
|---|---|---|---|
| 4,321,635 | 3/1982 | Tsuyuguchi | 360/72.1 |
| 4,414,584 | 11/1983 | Kurata | 358/907 |
| 4,425,587 | 1/1984 | Kurata | 360/78 |
| 4,530,018 | 7/1985 | Hoshino et al. | 360/72.1 |

FOREIGN PATENT DOCUMENTS 55-55443 4/1980 Japan .

Primary Examiner—Patrick R. Salce
Assistant Examiner—Jeffrey Sterrett
Attorney, Agent, or Firm—Wenderoth, Lind & Ponack

[57] ABSTRACT

Disclosed is a method of accessing data recorded in concentric circular or spiral tracks on a recording disc at high speed. A pickup at a position S on the disc is kicked to a position S' on a track on which an objective address data recorded position O exists. Thereafter, the disc is accelerated at a predetermined acceleration torque until the pickup reaches an intermediate position between the positions S' and O, which is determined by a rotational angle from the position S' to O. Then, the disc is decelerated at a predetermined deceleration torque so as to return a speed at which the pickup can read the recorded data before the pickup reaches the position O. With the acceleration and deceleration of the disc, the pickup can quickly become close to the position O and thus can access the data recorded at the position O within an extremely short time.

24 Claims, 7 Drawing Sheets

METHOD OF ACCESSING DATA RECORDED ON A DISK AT A HIGH SPEED

BACKGROUND OF THE INVENTION

1. Field of the Invention

This invention relates to a method of accessing data recorded in concentric circular or spiral information tracks on a disc in a recorded information reproduction apparatus.

2. Description of the Prior Art

Conventionally, a general approach to get objective address data recorded on a disc such as video disc, compact disc, and CD-ROM disc has been such that the reproduction apparatus coarsely moves a data pickup to be in the vicinity of the objective data by a traverse mechanism, then finely controls a head actuator or a lens actuator of the pickup itself to detect a track containing the objective address data, and sequentially reads address data until detecting the objective address data. In other words, after the track containing the objective data has been detected, it is necessary to wait for arrival of the objective data by rotation of the disc itself. This rotation awaiting time is about 0.3 seconds at the maximum in the case of a compact disc or a CD-ROM disc, which is a big problem.

For example, Japanese Laid-Open Patent Application No. 55-55443 aims at high-speed accessing but is only intended to access the objective track at high speed as described above.

In this case, assume that a data on the outermost track on a disc is accessed when the pickup is on the innermost track. It is relatively easy to reduce to about 0.1 seconds the time taken for detecting the outermost track on which the objective data exists. However, the waiting time after the outermost track has been detected is about 0.3 seconds at the maximum. In this case, the access time for the objective data is 0.4 seconds in total and it is difficult to reduce the time further. The maximum rotation awaiting time is a constant value of about 0.3 seconds which occupies most of the access time.

SUMMARY OF THE INVENTION

It is an object of this invention to provide a method capable of accessing a desired data on a rotating disc at much higher speeds than the conventional method.

In order to achieve the above object, according to the method of this invention, when pickup means for accessing recorded data while following concentric circular or spiral information tracks on a disc is at a position S when an objective address data on a position O is to be accessed, the number of tracks from the track on which the position S exists to the track on which the position O exists is detected, and the pickup means is kicked to a position S' on the track on which the position O exists. Thereafter, a rotational angle $\theta$ from the position S' to the position O is detected. Thereafter, a predetermined acceleration torque is first applied to the disc during a specific period determined by the value of $\theta$, and a predetermined deceleration torque is then applied to the disc. When the disc reaches the rotational speed immediately before the acceleration torque is applied thereto, namely, a rotational speed at which the recorded data is readable, the disc is returned to the original normally controlled rotational state to detect the objective address data position O. According to this method, the time required from the detection of the track on which the objective data exists to the detection of the objective data is greatly reduced (i.e., the rotation awaiting time is greatly reduced) to thereby permit accessing data at high speed.

Preferably, after $\theta$ has been detected, a maximum acceleration torque is applied to the disc for an interval of about $\theta/2$, and a maximum deceleration torque is then applied to the disc so that the rotational speed of the disc is returned to a rotational speed in which the recorded data is readable before the pickup means reaches the position O.

DESCRIPTION OF PREFERRED EMBODIMENT

Figure 1:
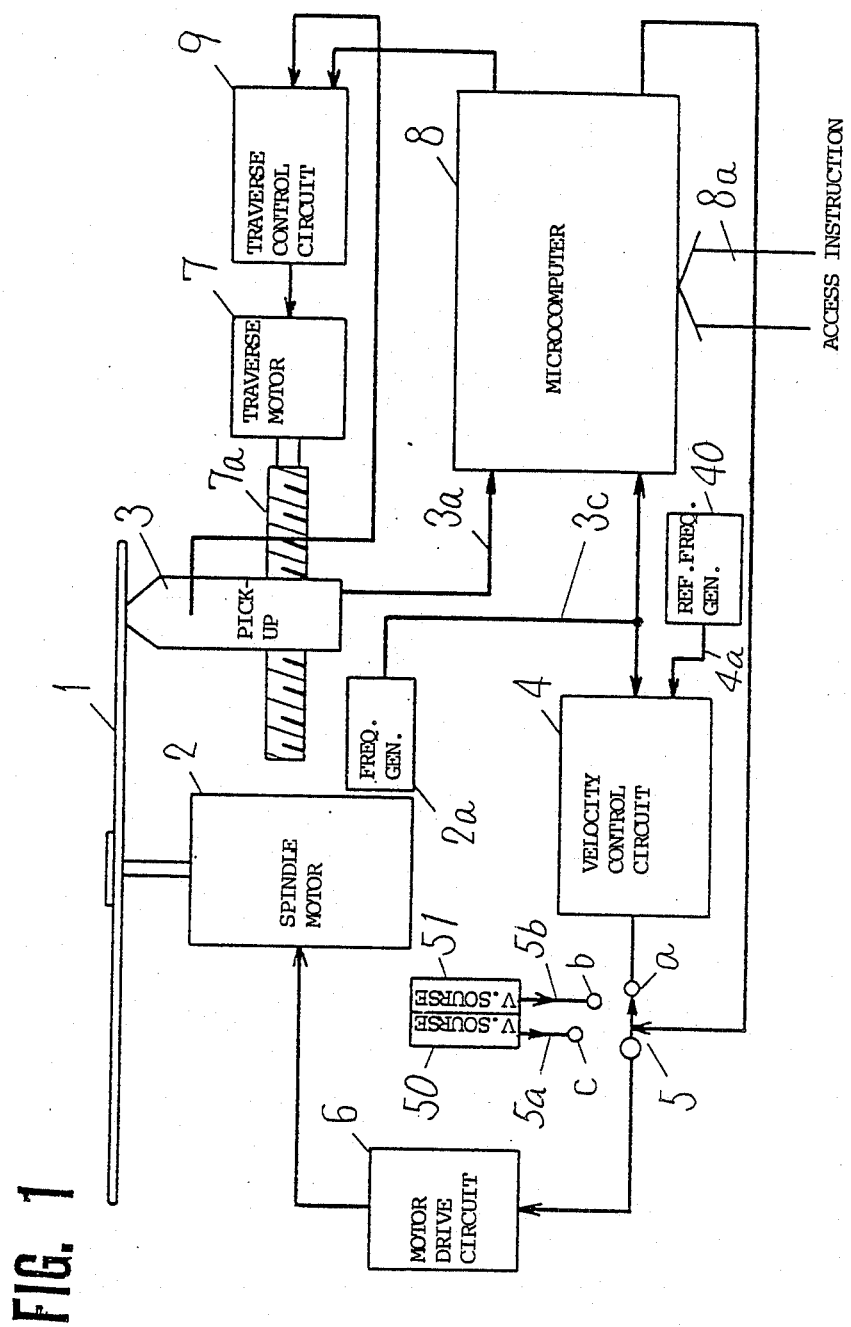
FIG. 1 is a block diagram of one embodiment of a recorded information reproduction apparatus which embodies the data access method according to this invention.

FIG. 1 shows one embodiment of a recorded information reproduction apparatus according to this invention. In FIG. 1, a recording disc 1 is driven by a spindle motor 2 having a frequency generator 2a. Spindle motor 2, namely, frequency generator 2a produces a frequency signal 3c which is proportional to the rotational speed of disc 1. The frequency signal 3c from frequency generator 2a is compared by a velocity control circuit 4 with a reference frequency 4a corresponding to a reference rotational speed, which is produced by a reference frequency generator 40, to be converted to a velocity error voltage. This voltage is applied via a change-over position a of a switch 5 to a motor drive circuit 6 which supplies power to spindle motor 2. When switch 5 is connected to a change-over position b, a full deceleration command 5b is applied to motor drive circuit 6, and when the switch is connected to a change-over position c, a full acceleration command 5a is applied. The full acceleration and deceleration commands 5a and 5b are voltage signals produced by voltage sources 50 and 51, respectively. A velocity control (inclusive of phase control) loop is constituted by spindle motor 2, frequency generator 2a, velocity control circuit 4 and motor drive circuit 6.

A pickup 3 is caused to traverse tracks on disc 1 by a traverse motor 7 and a screw 7a.

A microcomputer 8 calculates an amount of the traverse movement from an access command 8a given by a main controller (not shown) and an output signal 3a from pickup 3 and gives a corresponding signal to a traverse control circuit 9 to drive traverse motor 7 to thereby move pickup 3 to an objective track. On the other hand, after the objective track is detected, microcomputer 8 monitors the frequency signal 3c from frequency generator 2a and controls switch 5 to accelerate and decelerate spindle motor 2 to expedite the arrival of an objective address data recorded position.

Figure 2:
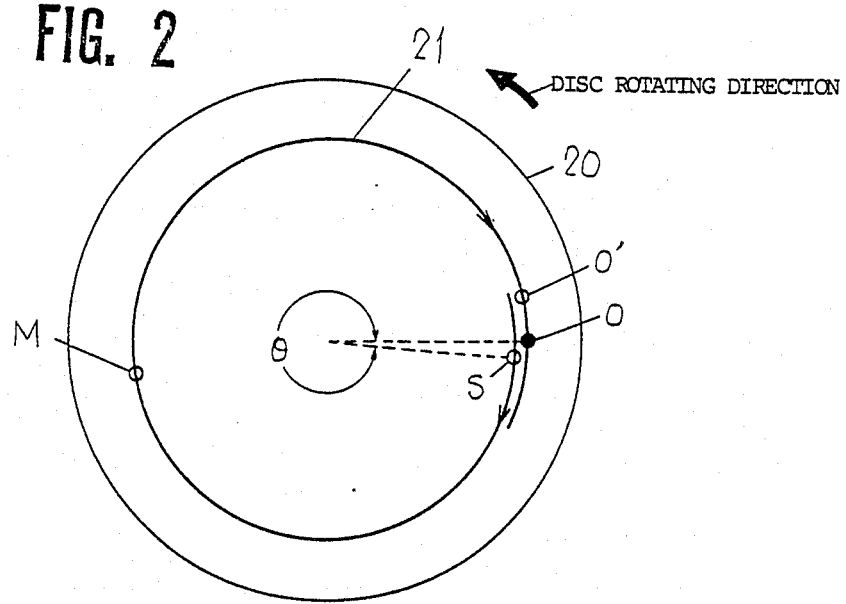
FIGS. 2 and 4 illustrate tracks on a disc for showing the operation to reduce the rotation awaiting time for data detection in this invention.
Figure 3:
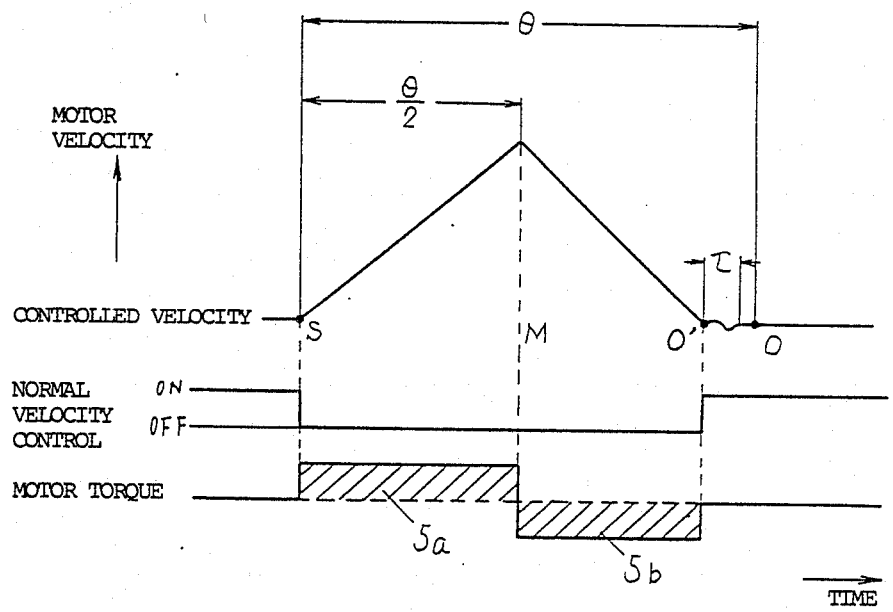
FIG. 3 is a timing chart showing the access operation in FIG. 2.

FIGS. 2 and 3 are a view showing a state of a disc and a timing chart, respectively, for explaining the operation for reducing the time required for the pickup to reach an objective point after a track containing the objective point has been detected. In FIG. 2, reference numeral 20 denotes a disc and 21 a track containing an objective address data.

In FIG. 2, assume that detection of track 21 containing an objective address data recorded position O has been completed at a position S. Further assume that at this time a rotational angle from point S to O is $\theta$. As shown in FIG. 3, at point S, switch 5 is switched from position a to position c to apply a full acceleration command 5a to motor drive circuit 6 to accelerate spindle motor 2. When the pickup comes to an approximately middle position M ($\theta/2$) between positions S and O, switch 5 is switched from position c to position b to apply a full deceleration command 5b to motor drive circuit 6 to decelerate spindle motor 2. When the rotational speed of spindle motor 2 reaches approximately the speed at point S before the full acceleration (at a position O'), switch 5 is returned to its initial position a to return the motor 2 to be under its normal velocity control.

Detection of the point O' is performed by measuring the period of the frequency signal 3c from frequency generator 2a at microcomputer 8.

Although the absolute values of the full acceleration and deceleration commands 5a, 5b are same, the effective deceleration torque generated by spindle motor 2 is necessarily larger than the acceleration torque due to losses inherent to spindle motor 2 (shaft loss, hysteresis loss, etc.). Therefore, even if the switching point from the acceleration to the deceleration is set at the middle ($\theta/2$) of the necessary rotational angle $\theta$, the position O' where the motor is returned to its normal velocity controlled state is necessarily before the objective position O. Thereafter, when a setting time of $\tau$ of the regular velocity control system has past, the objective address position O is attained. In other words, the position O' never overshoot the position O.

While in the above description the interval during which spindle motor 2 is accelerated and decelerated is shown by the rotational angle, this can be monitored actually by causing microcomputer 8 to count the pulses of the frequency signal from frequency generator 2a. For example, if the number of pulses produced during one complete rotation of frequency generator 2a is N, one pulse from generator 2a corresponds to a rotational angle of $2\pi/N$. Therefore, in the above example, the spindle motor is full-accelerated during a time interval during when frequency generator 2a outputs ($\theta/2 \times N/2\pi$) pulses (fractions are omitted). Thereafter, the motor is full-decelerated, and microcomputer 8 measures the period of the frequency signal from generator 2a to detect the timing at which the spindle motor is returned to its normal velocity controlled state, namely, switch 5 is returned to position a.

Figure 4:
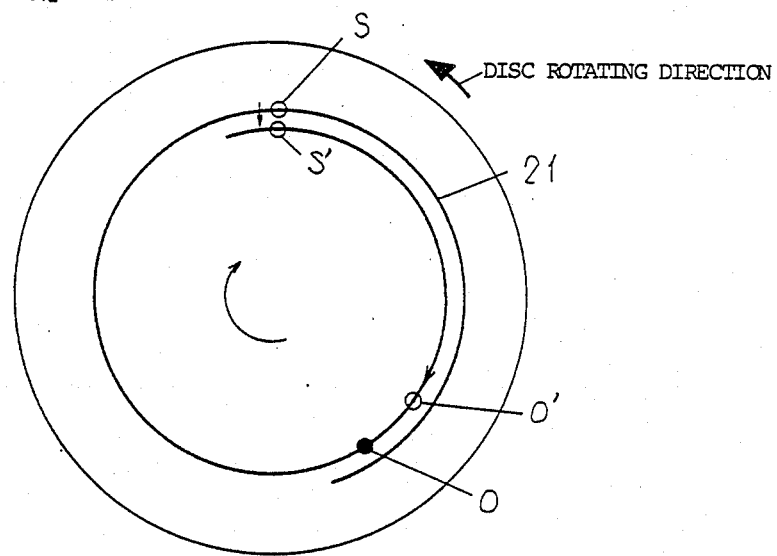

FIG. 4 shows an example where the first detection position S on track 21 has already past the objective address position O within one complete rotation. In this case, the pickup is jumped immediately from position S to position S'. Thereafter, the same operations as those described above with reference to FIGS. 2 and 3 are performed so that motor 2 ends its acceleration and deceleration at position O' before reaching the objective address position O. Usually, the track jump from S to S', as described above, is performed by driving a lens actuator contained in pickup 3, with traverse motor 7 maintained stopped i.e., without driving the entire pickup 3.

Figure 5:
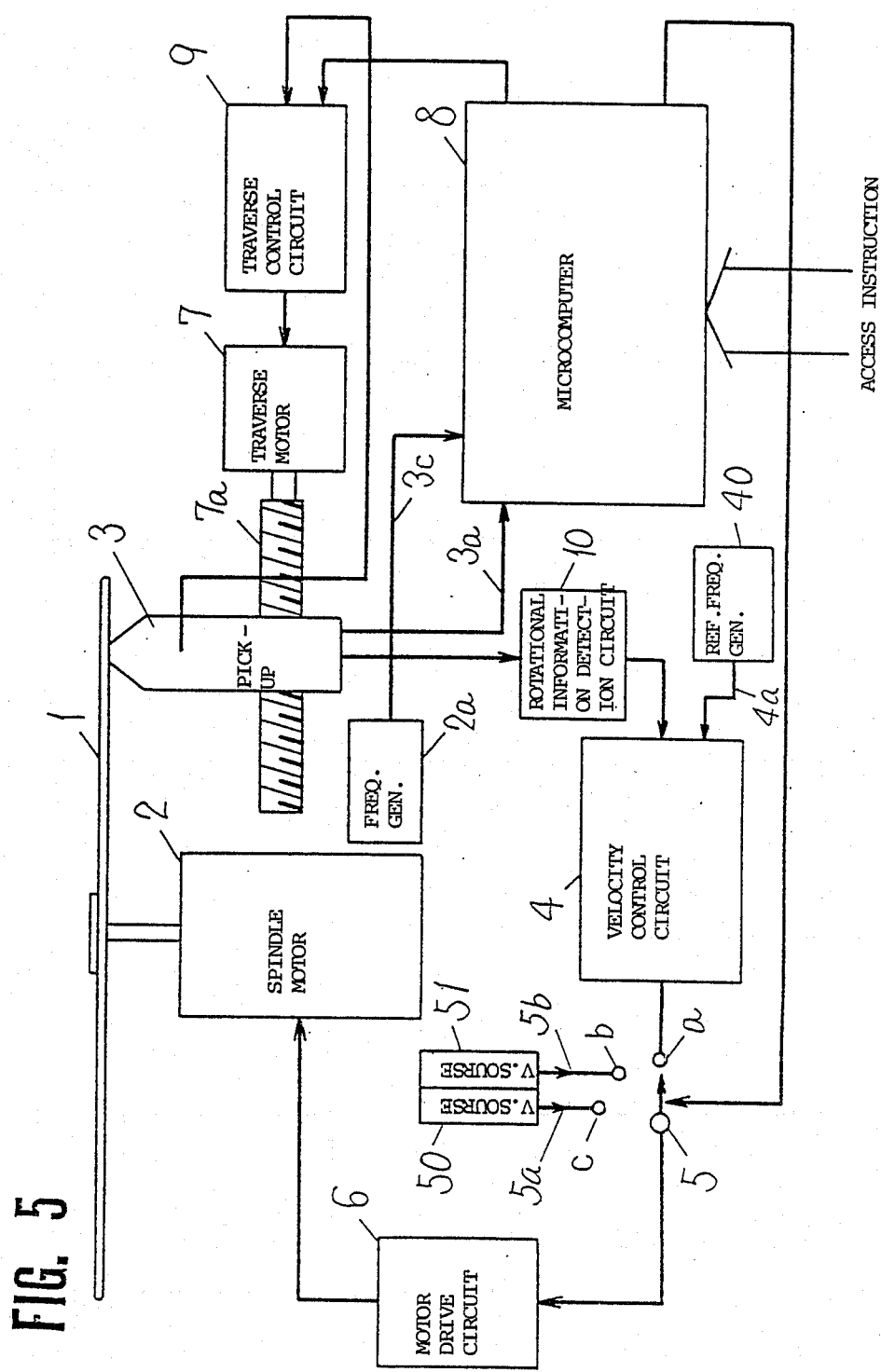
FIGS. 5 and 6 are block diagrams of other embodiments of recorded information reproduction apparatus which embody the data access methods according to this invention.

FIG. 5 is a schematic diagram of another embodiment of this invention in which disc 1 is a CLV (constant line velocity) disc on which control rotation information is recorded like a compact disc.

In FIG. 5, a rotational information detection circuit 10 extracts the rotational information (rotational synchronization pulse) for disc 1 from an information read from disc 1 by pickup 3. When switch 5 is at the changeover position a, a constant line velocity (CLV) control circuit, which maintains constant the line velocity of the disc, is constituted by pickup 3, rotational information detection circuit 10, velocity control circuit (inclusive of a phase control circuit) 4, motor drive circuit 6, and spindle motor 2. The CLV control circuit controls the rotation of disc 1 so that the frequency and phase of the output signal from rotational information detection circuit 10 become equal to those of the reference frequency 4a. To this end, the rotation of disc 1 is controlled so that it rotates at a higher speed when an inner track is accessed than a speed when an outer track is accessed in inverse proportion to the radius (i.e. the line velocity is constant).

The operation of the embodiment of FIG. 5 is basically the same as that of FIG. 1, but differs from the latter in the manner of detecting or monitoring the rotational angle $\theta$. Since the rotational speed of the CLV disc varies depending upon the position accessed, one complete rotational period T of the track containing the objective address data is calculated in advance by microcomputer 8. When the address of the position S is read, microcomputer 8 calculates a time t required for reproduction from the address at the position S to the address at the position O' (which is set necessarily at a position before the position O in consideration of the control gain of the control system for spindle motor 2 on the basis of the position O), and $t/T \times N$ (where N is the number of produced pulses per rotation of frequency generator 2a) to determine the number of output pulses from frequency generator 2a corresponding to the rotational angle $\theta$. After this processing, the spindle motor 2 is fully-accelerated until tN/2T pulses output from frequency generator 2a are counted, and then full-decelerated until the position O'. If the line velocity of disc 1 is constant during calculation of one rotational period of the track containing the objective address data, the address and the rotational period at that time are in one-to-one correspondence to each other, so that a table for this purpose may be contained in microcomputer 8 or one rotational period may be reversely calculated from the value of the objective address (time indication) by means of numerical expressions.

Figure 6:
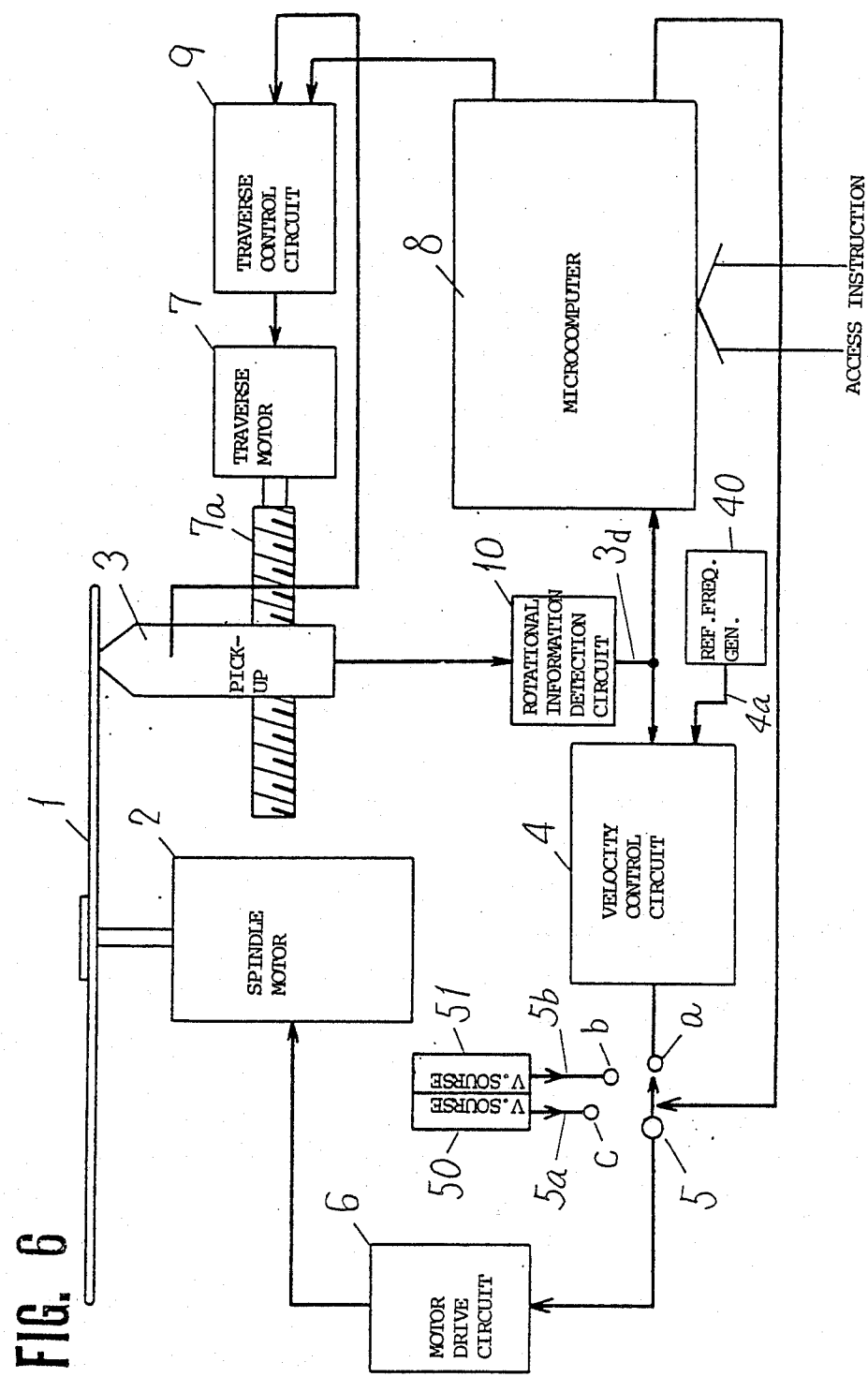

FIG. 6 shows still another embodiment of this invention which uses a detected frequency 3d from rotational information detection circuit 10 instead of the frequency signal from the frequency generator as the information for detecting the rotational angle $\theta$, and other operations are the same as those of the above embodiments described already.

The detection of the timing for returning the spindle motor to the original normally controlled state after the full deceleration can be performed by measuring the period of the detected frequency 3d from the rotational information detection circuit 10.

Figure 7:
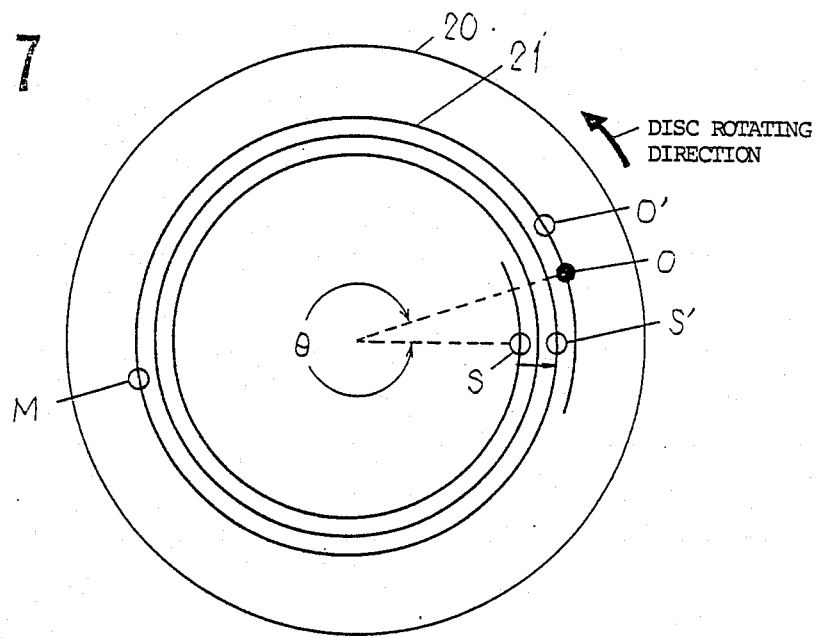
FIGS. 7 and 9 illustrate tracks on a disc for showing the operation according to this invention in which the objective data is accessed from a point several tracks before the track on which the objective data exists and from a point several tracks after the objective track, respectively.
Figure 8:
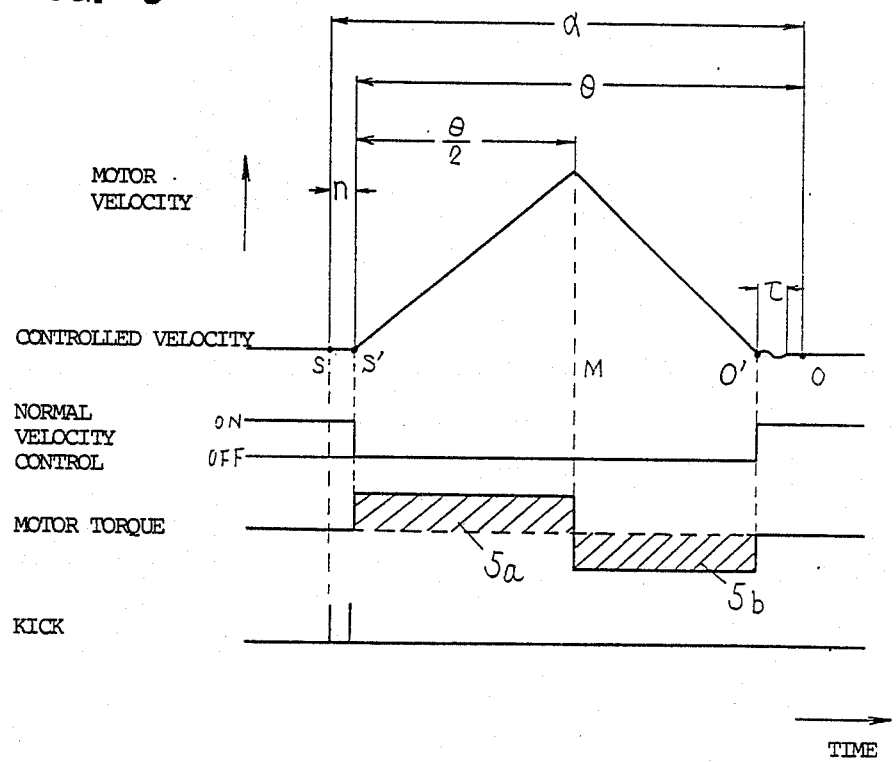
FIG. 8 is a timing chart showing the access operation in FIG. 7.

FIGS. 7 and 8 respectively show the state of a disc and a timing chart for explaining the operation for reducing the time from the detection of a position S several tracks before the track containing the objective address data to the detection of the objective address data existing position O. In FIG. 7, assume that the rotational angle from position S to position O is $4\pi + \theta$ (where $\theta < 2\pi$), namely, position S is two tracks (two rotations) plus $\theta$ before position O. As shown in FIG. 8, pickup 3 is kicked from position S to the position S' over two tracks in the track advancing direction. Thereafter, switch 5 shown in FIG. 1 is switched from position a to position c to give a full acceleration command 5a to motor drive circuit 6 to thereby accelerate spindle motor 2. When pickup 3 comes to a middle position M ($\theta/2$) between position S' and the objective position O, switch 5 is switched from position c to position b to give a full deceleration command 5b to motor drive circuit 6 to decelerate spindle motor 2. When the rotational speed of spindle motor 2 comes approximately to the original speed before the full acceleration, namely, to that at position S (point S') (when it comes to position O'), switch 5 is returned to its original state a to recover the spindle motor to its normally controlled state.

Figure 9:
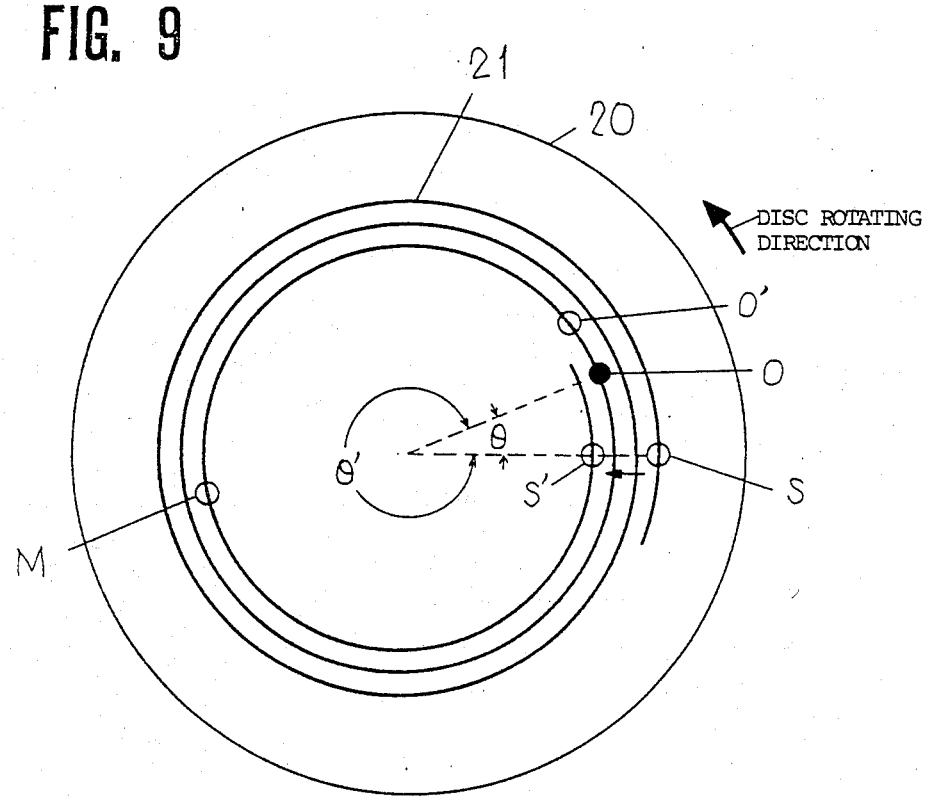

FIG. 9 shows an example in which the first detection position S has already past the objective address position O. In this case, assume that the rotational angle from position O to position S is also $4\pi + \theta$ (where $\theta < 2\pi$). As in above explanation, pickup 3 is kicked from position S to position S' over three tracks in the direction opposite to the track advancing direction. Thereafter, spindle motor 2 is full-accelerated and then full-decelerated so as to arrive at position O' to be returned to its normally controlled state where switch 5 is at the position a to detect the objective address data at position O. In this case, the rotational angle from position S' to O is $\theta'$, namely, $2\pi - \theta$, so that the switching of spindle motor 2 from the full acceleration to the full deceleration is performed at an angle of $(2\pi - \theta)/2$.

Namely, in general terms, when the position S at which the pickup arrives is before the objective address data existing position O, the access time can be reduced rationally by setting the number of tracks over which the pickup is to be kicked and the angle at which the full acceleration is switched to the full deceleration to n and $\theta/2$, respectively, where n is a quotient and $\theta$ is a remainder when the rotational angle $\alpha$ from position S to position O is divided by $2\pi$.

When the position S has already past position O, the access time can be reduced rationally by setting the number of tracks over which the pickup is to be kicked and the angle at which the full acceleration is switched to the full deceleration to n+1 and $(2\pi - \theta)/2$, respectively, where n is a quotient and $\theta$ is a remainder when the rotational angle $\alpha$ from position O to position S is divided by $2\pi$.

While this invention has been described using a disc on which data are recorded in spiral tracks, the similar effect can be obtained by using a disc on which data are recorded in concentric circular tracks.

Further, in the above embodiments, after a track on which the objective data exists is detected, the acceleration and deceleration are each effected for substantially the same time interval. However, the time intervals for the acceleration and deceleration may be changed so as to compensate for the losses involved in the spindle motor by microcomputer calculation.

Generally, the arrangement may be such that a predetermined acceleration torque is applied to the disc for a predetermined interval $\theta a$ (where $\theta a < \theta$) and then a predetermined deceleration torque is applied to the disc for a predetermined interval $\theta b$ ($\theta b < \theta - \theta a$) to return the rotational speed of the disc to the speed at which data is readable.

What is claimed is:

1. A method of accessing data recorded in concentric circular or spiral information tracks on a disc using a pickup for reading data following the information tracks, comprising the steps of:
   detecting the number of tracks from a track on which a current position S of the pickup exists to a track on which an objective address data recorded position O exists;
   moving the pickup to a position S' on the track on which the position O exists in accordance with the detected number of tracks;
   detecting a rotational angle $\theta$ from the position S' to the position O;
   accelerating the disc at a predetermined acceleration torque for a predetermined time interval in accordance with the value of $\theta$ to rotate the disc over a predetermined angle;
   decelerating the disc for a predetermined time at a predetermined reduction torque to return the disc to a rotational speed at which data is readable before the pickup reaches the position O; and
   reading data when the pickup reaches the position O.

2. A method according to claim 1, wherein the step of moving the pickup from the position S to the position S' includes causing the pickup traverse the information tracks to the position S'.

3. A method according to claim 1, wherein when the position S is before the position O, the step of detecting the number of tracks includes calculating a value n obtained by dividing by $2\pi$ a rotational angle from the position S to the position O and omitting a remainder, and the step of moving the pickup from the position S to the position S' includes moving the pickup so as to traverse the information tracks to nth track after the track on which the position S exists.

4. A method according to claim 1, wherein when the position S is after the position O, the step of detecting the number of tracks includes calculating a value n obtained by dividing by $2\pi$ a rotational angle from the position S to the position O and omitting a remainder, and the step of moving the pickup from the position S to the position S' includes moving the pickup so as to traverse the information tracks to (n+1)th track before the track on which the position S exists.

5. A method according to claim 1, wherein the step of detecting the rotational angle $\theta$ includes calculating $\theta$ from an address data of the position S' that the pickup has read and an objective address.

6. A method according to claim 1, wherein a time in the step of accelerating the disc is monitored by counting pulses in a rotational speed detection pulse signal produced from a drive source for driving the disc.

7. A method according to claim 1, wherein a time in the step of accelerating the disc is monitored by counting rotational synchronous pulses from the disc detected by the pickup.

8. A method of accessing data recorded in concentric circular or spiral information tracks on a disc using a pickup for reading data following the information tracks, comprising the steps of:

detecting the number of tracks from a track on which a current position S of the pickup exists to a track on which an objective address data recorded position O exists;

moving the pickup to a position S' on the track on which the position O exists in accordance with the detected number of tracks;

detecting a rotational angle $\theta$ from the position S' to the position O;

accelerating the disc at a full acceleration torque over an angle of generally $\theta/2$;

decelerating the disc at a full decelaration torque to return the disc to a rotational speed at which data is readable before the pickup reaches the position O; and reading data when the pickup reaches the position O.

9. A method according to claim 8, wherein the step of moving the pickup from the position S to the position S' includes causing the pickup traverse the information tracks to the position S'.

10. A method according to claim 8, wherein when the position S is before the position O, the step of detecting the number of tracks includes calculating a value n obtained by dividing by $2\pi$ a rotational angle from the position S to the position O and omitting a remainder, and the step of moving the pickup from the position S to the position S' includes moving the pickup so as to traverse the information tracks to nth track after the track on which the position S exists.

11. A method according to claim 8, wherein when the position S is after the position O, the step of detecting the number of tracks includes calculating a value n obtained by dividing by $2\pi$ a rotational angle from the position S to the position O and omitting a remainder, and the step of moving the pickup from the position S to the position S' includes moving the pickup so as to traverse the information tracks to (n+1)th track before the track on which the position S exists.

12. A method according to claim 8, wherein the step of detecting the rotational angle $\theta$ includes calculating $\theta$ from an address data of the position S' that the pickup has read an objective address.

13. A method according to claim 8, wherein a time in the step of accelerating the disc is monitored by counting pulses in a rotational speed detection pulse signal produced from a drive source for driving the disc.

14. A method according to claim 8, wherein a time in the step of accelerating the disc is monitored by counting rotational synchronous pulses from the disc detected by the pickup.

15. A method of accessing data recorded in concentric circular or spiral information tracks on a disc using a pickup for reading data following the information tracks, when a current position S of the pickup is on a track on which a position O where an objective address data is recorded exists, comprising the steps of:

detecting a rotational angle $\theta$ from the position S to the position O;

accelerating the disc at a predetermined acceleration torque for a predetermined time to rotate the disc over a predetermined angle;

decelerating the disc at a predetermined deceleration torque to return the disc to a rotational speed at which data is readable before the pickup reaches the position O; and reading data when the pickup reaches the position O.

16. A method according to claim 15, wherein the step of detecting the rotational angle $\theta$ includes calculating $\theta$ from an address data of the position S that the pickup has read and an objective address.

17. A method according to claim 15, wherein a time in the step of accelerating the disc is monitored by counting pulses in a rotational speed detection pulse signal produced from a drive source for driving the disc.

18. A method according to claim 15, wherein a time in the step of accelerating the disc is monitored by counting rotational synchronous pulses from the disc detected by the pickup.

19. A method of accessing data recorded on concentric circular or spiral information tracks on a disc using a pickup for reading data following the information tracks, when a current position S of the pickup is on a track on which a position O where an objective address data is recorded exists, comprising the steps of:

detecting a rotational angle $\theta$ from the position S to the position O;

accelerating the disc at a full acceleration torque over an angle of generally $\theta/2$;

decelerating the disc at a full deceleration torque to return the disc to a rotational speed at which data is readable before the pickup reaches the position O; and reading data when the pickup reaches the position O.

20. A method according to claim 19, wherein the step of detecting the rotational angle $\theta$ includes calculating $\theta$ from an address data of the position S that the pickup has read and an objective address.

21. A method according to claim 19, wherein a time in the step of accelerating the disc is monitored by counting pulses in a rotational speed detection pulse signal produced from a drive source for driving the disc.

22. A method according to claim 19, wherein a time in the step of accelerating the disc is monitored by counting rotational synchronous pulses from the disc detected by the pickup.

23. A method of accessing data recorded in concentric circular or spiral information tracks on a disc using a pickup for reading data following the information tracks, comprising the steps of:

causing the pickup traverse the information tracks to a position S' on an objective track on which a position O where an objective address data is recorded exists when a current position S of the pickup is not on the objective track, and regarding the position S as the position S' when the position S is on the objective track;

detecting a rotational angle $\theta$ from the position S' to the position O;

accelerating the disc at a predetermined acceleration over a predetermined angle in accordance with the rotational angle $\theta$;

decelerating the disc at a predetermined deceleration until the rotational speed of the disc becomes a data-readable speed before the pickup reaches the position O; and reading data when the pickup reaches the position O.

24. A method according to claim 23, wherein the step of accelerating the disc includes a step of accelerating the disc over an angle of generally $\theta/2$ at a full acceleration torque, and the step of decelerating the disc includes a step of decelerating the disc at a full deceleration torque to return the disc to the data-readable speed.

* * * * *